United States Patent [19]
Golson

[11] Patent Number: 5,390,332
[45] Date of Patent: Feb. 14, 1995

[54] METHOD AND APPARATUS FOR PERFORMING A TAKEOVER OF A MICROPROCESSOR

[75] Inventor: Steven E. Golson, Carlisle, Mass.

[73] Assignee: Sun Microsystems, Inc., Mountain View, Calif.

[21] Appl. No.: 945,214

[22] Filed: Sep. 15, 1992

[51] Int. Cl.⁶ .............................................. G06F 13/24
[52] U.S. Cl. ..................... 395/725; 364/228; 364/229.2; 364/240; 364/240.1; 364/242.1; 364/DIG. 1
[58] Field of Search ............... 395/725, 325, 650, 575, 395/275, 775, 425; 371/23, 11.3, 15.1; 364/132, 186, 578

[56] References Cited

U.S. PATENT DOCUMENTS

| | | | |
|---|---|---|---|
| 3,940,743 | 2/1976 | Fitzgerald | 395/325 |
| 4,015,243 | 3/1977 | Kurpanek et al. | 395/325 |
| 4,219,873 | 8/1980 | Kober et al. | 395/650 |
| 4,268,902 | 5/1981 | Berglund et al. | 395/325 |
| 4,296,466 | 10/1981 | Guyer et al. | 395/275 |
| 4,701,845 | 10/1987 | Andreasen et al. | 395/575 |
| 4,779,187 | 10/1988 | Letwin | 364/200 |
| 5,008,805 | 4/1991 | Fiebig et al. | 364/184 |

FOREIGN PATENT DOCUMENTS

| | | | |
|---|---|---|---|
| 0391173 | 10/1990 | European Pat. Off. | G06F 11/00 |
| 9203527 | 5/1993 | Germany | G06F 9/455 |

OTHER PUBLICATIONS

Article entitled: "DOS on the Sun 386i," author: John Lazarus, Jim Lerner; publication: Sun Technology; date: Summer, 1988.
Article entitled: "System Management Mode Explained," author: Mark Thorson; publication: Microprocessor Report; date: Jun. 17, 1992.
Article entitled: "The Intel System Management Mode," author: Simon C. Ellis; publication: Microprocessor Report; date: Feb. 12, 1992.
IRE Wescon Convention Record; vol. 32, Nov. 1988, North Hollywood, Calif. US; pp. 1–4; Charles Melear, "M88000 Development Tools" p. 3, left col., line 40 –right col., line 25.
Electronic Design; vol. 34, No. 19, Aug. 1986; Hasbrouck Heights, N.J. US; p. 34; Ray Weis, "In-Circuit Emulation Arrives for Multiprocessor Systems".

*Primary Examiner*—Gopal C. Ray
*Attorney, Agent, or Firm*—Blakely, Sokoloff, Taylor & Zafman

[57] ABSTRACT

A computer system consisting of a host processor, memory and peripheral devices coupled via a bus which provides emulation of a microprocessor by coupling the microprocessor to the bus. The host processor provides emulation of microprocessor peripherals such that a microprocessor based system is supported and executes processes. A takeover mechanism is provided to enable the host processor to temporarily takeover the microprocessor to perform certain tasks. The host processor causes an interrupt to occur in the microprocessor and monitors the bus cycles initiated by the microprocessor to determine when the microprocessor performs fetches of the routine to service the interrupt. The host processor intercepts fetches for information regarding the location of the interrupt service routine and provides information that causes the microprocessor to execute code of a process to be executed during the takeover. For example, during the takeover, noninvasive debugging of the microprocessor can be performed. Alternatively, a context switch of processes can be performed during the takeover whereby the microprocessor will continue processing in the context of the process stored in the microprocessor. Once the takeover is complete, the host processor places the microprocessor in a state for normal processing after which normal processing by the microprocessor continues.

21 Claims, 5 Drawing Sheets

(page 1 of 2)

(page 2 of 2)

METHOD AND APPARATUS FOR PERFORMING A TAKEOVER OF A MICROPROCESSOR

BACKGROUND OF THE INVENTION

1. Field of the Invention

The method and apparatus of the present invention relates to the field of operating a microprocessor as a slave processor of a host computer system. More particularly, the method and apparatus of the present invention relates to the control of a microprocessor coupled to a host computer system as a peripheral device to provide emulation of a microprocessor system.

2. Related Applications

This application is related to U.S. patent application Ser. No. 07/815,245, titled "Memory Management Structure for I/O Emulation," filed Dec. 31, 1991, and is hereby incorporated by reference.

3. Art Background

Although computers and systems are becoming more sophisticated and faster, there is still a need to be able to be "backward compatible"; that is, there is still a need for the more current computer systems to have the capability to run pre-existing software initially developed to run on older systems. This is particularly the case when the program has an extensive user base or the older system the newer computer system is replacing has a large user base. Thus, computer system manufacturers develop emulation programs that emulate the older system in order to run software designed to run on older systems.

The emulation may be achieved purely through software wherein the software interprets the instructions to be executed and translates them into the form that the newer system understands. However, this is quite time consuming and the system is noticeably slowed. An alternative is provide a mixture of hardware and software to provide the emulation. For example, a powerful workstation such as those manufactured by Sun Microsystems, Inc., Mountain View, Ca., may provide emulation of the disk operating system ("DOS") which typically operates on an IBM personal computer "PC" (manufactured by International Business Machines, Armonk, N.Y.). This emulation may be achieved by connecting the CPU chip utilized in the IBM PC as a peripheral to the workstation wherein the CPU chip can execute the instructions for the software program in a timely manner and the workstation provides the peripheral support. For example, the workstation provides the memory and input/output means to the microprocessor in order to form the system. A popular microprocessor utilized, and the one used in the IBM PC is a CPU chip manufactured by Intel Corporation, Santa Clara, Ca., specifically the Intel 80486, 80386, 80286, 8086 or 8088.

The microprocessor CPU chip coupled to the workstation functions as if the microprocessor is directly connected to the peripheral devices it interacts with. The workstation is not visible to the microprocessor. However, it is sometimes desirable that the workstation temporarily take over or interfere with normal operations of the microprocessor. For example, it may be necessary to monitor the internal contents of the microprocessor registers in order to debug or to measure system performance. Another example is the ability to perform context switching on a microprocessor which does not have multiprocessing capability. These temporary "takeovers" must be performed without disturbing the state of the microprocessor by ensuring that the state of the microprocessor is restored after the takeover is finished.

The more current CPU chips, the 80386 and 80486, provide a number of system operating modes which provide different functionality to the system. For example, the 80486 supports a virtual 86 mode, a real mode and a protected mode. The real mode is an emulation of the original 8086 processor. The virtual 86 mode provides the ability to execute a number of 8086 applications concurrently. The protected mode is sometimes desirable because it provides a means to protect certain pieces of hardware from being accessed by other processes because the process operating in protected mode essentially "owns" the processor. However, because the process "owns" the processor, only one protected mode process may execute at any one time. In 80486 or 80386 based systems this is typically not a problem because by virtue of the microprocessor functionality the user is restricted to execute one protected mode process at a time. However, in an environment where a guest processor is connected to a host processor, whereby processes executed on the guest processor are controlled by and executed through the host processor, it would seem feasible that if the host processor can multi-process then the guest can also multiprocess. However, this is not always a simple task because if the current guest process executing controls the state of the guest processor and the guest processor cannot concurrently execute multiple processes, the current process would have to be terminated on the guest processor before the next process can be executed.

If the guest processor is an 80486 operating DOS in a workstation that allows multi-processing through a window system, the user can open up a plurality of windows, all which could access the 486 processor and execute programs developed to run on the IBM PC and the DOS operating system. When a user attempts to execute two processes using the DOS operating system and both processes include protected mode operations, the processor will not properly execute the processes because it cannot concurrently execute more than one protected mode process. This problem frequently arises during execution of a process which may initially start in one mode, such as the real mode, and then switch mid-point to instructions which are protected and can only be executed in the protected mode. Thus, there is no way to initially determine whether a program requires the protected mode of the microprocessor.

SUMMARY OF THE INVENTION

It is therefore an object of the present invention to provide a method and apparatus to perform a temporary takeover of a microprocessor without disturbing the state of the microprocessor.

It is an object of the present invention in an emulation system composed of a host computer system and a microprocessor coupled to the host computer system as a peripheral to perform debug operations on the microprocessor which are non-intrusive and do not disturb the state of the microprocessor.

It is an object of the present invention to provide a method and apparatus for concurrently executing multiple protected mode applications in a single protected mode microprocessor.

It is an object of the present invention to provide a method and apparatus for performing context switching in a microprocessor to switch from one protected mode application to another which is independent of the microprocessor.

In the computer system of the present invention, the microprocessor is connected as a peripheral to the host processor. The host processor sends an interrupt to the microprocessor at the time that it is desirable to perform a temporary takeover of the microprocessor to change the state of the microprocessor or perform a task such as to noninvasively examine the contents of the state of the microprocessor. The host further causes the microprocessor to function in single step mode wherein the microprocessor stops or traps after each instruction. Upon receipt of the interrupt, the microprocessor proceeds in a single step mode, to service the interrupt. The host processor monitors the actions and the messages sent by the microprocessor and intercepts the microprocessor's request to read the descriptor table entries and other data structures and sends the microprocessor instructions to perform whatever action is desired, such as retrieving the state of the microprocessor for access by the host computer to perform debug operations. Once the takeover is complete, the microprocessor resumes normal operations. In an alternate embodiment, the microprocessor executes the code of the context switching routine, saving the states of various registers in the microprocessor and loading the states of the same registers that exist for the process to be executed after completion of the context switch, whereby the microprocessor continues execution in the context of the second process. The states of registers with respect to the first process are saved such that a subsequent context can be performed to continue processing of the first process.

BRIEF DESCRIPTION OF THE DRAWINGS

The objects, features and advantages of the present invention will be apparent to one skilled in the art in view of the following detailed description of the preferred embodiment in which.

DETAILED DESCRIPTION OF THE INVENTION

Figure 1:
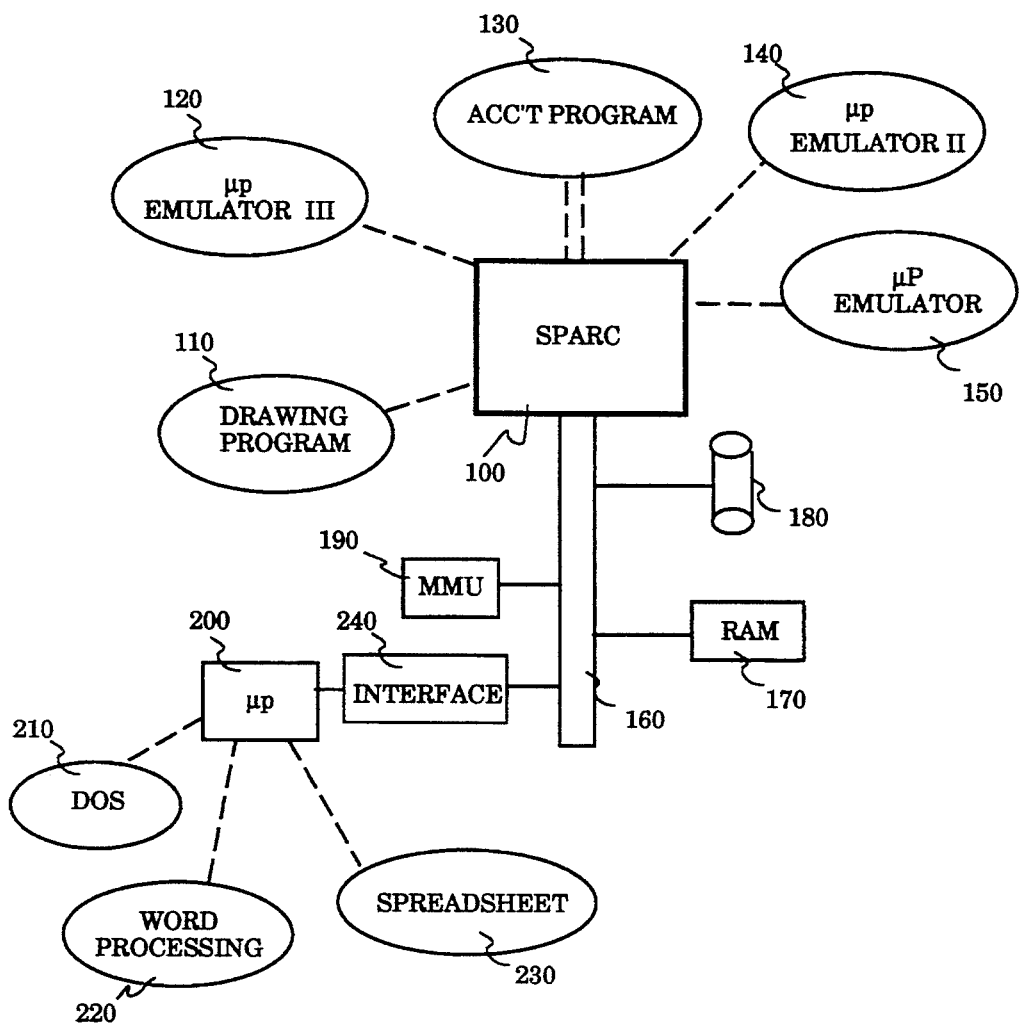
FIG. 1 illustrates the system configuration of the preferred embodiment of the present invention.

FIG. 1 is illustrative of the preferred embodiment of the present invention in which there is a host processor, for example, a UNIX based processor such as those manufactured by Sun Microsystems, Inc., Mountain View, Ca. The host processor 100 is typically operating under a first operating system, for example UNIX ® (UNIX is a registered trademark of AT&T) and is a multi-tasking system in which multiple processes 110, 120, 130, 140 and 150 may be executing. In addition, the processor 100 is connected to an internal bus 160 to which peripherals are connected such as the memory management unit 190, memory 170, storage 180, as well as various device controllers. In addition, a second processor 200, such as an Intel 80386 or 80486 microprocessor, is connected to the bus. This processor executes instructions generated by a second operating system 210, such as the disk operating system (DOS) manufactured by Microsoft Corporation and which typically operates on an IBM personal computer or compatible computer system.

Through the microprocessor 200 the DOS operating system 210 may execute and control the processor to run software 220, 230 developed to run on an IBM PC or compatible in the DOS environment. The host processor 100 provides the peripheral emulation and support for the microprocessor 200. Software is provided to emulate the peripherals connected to the microprocessor 200. An interface 240 is further included to provide the ability for the host processor to control the various signal lines on the microprocessor such as the interrupt signal lines and perform a memory translation between the local memory address space of the microprocessor and the address space of the host processor. Preferably, an interface such as that described in copending U.S. patent application Ser. No. 07/815,245 titled "Memory Management Structure for I/O Emulation," filed Dec. 31, 1991 is utilized. Thus the host processor 100, through the interface 240, provides the emulation of peripherals and memory for the microprocessor. If, for example, the microprocessor 200 requires data stored in off-line memory 180, the microprocessor would send out an address to read from the off-line memory 180. The interface 240 would translate the address of the memory request to an address compatible with the address space of the host processor. The memory request is then put out on the bus 160 to be received by the memory management unit. The memory management unit of the host, upon receipt of the request, will perform any additional address translation necessary to access the data requested by the microprocessor 200 and will cause the data read to be transferred back down the bus 160 to the interface 240 which inputs the data to the microprocessor 200. This sequence of events is transparent to the microprocessor which operates as if it was operating in a stand-alone system with its own dedicated peripherals attached.

The following discussion will be directed to the interface of an Intel microprocessor such as the 80486 which is connected to a workstation, such as the SPARCstation ® (SPARCstation is a registered trademark of SPARC International, Inc.); however, it will be apparent to one skilled in the art that the system of the present invention is not limited to Intel microprocessors, nor is it limited to workstations and is generally applicable to a microprocessor operating in conjunction with a host processor.

Figure 2:
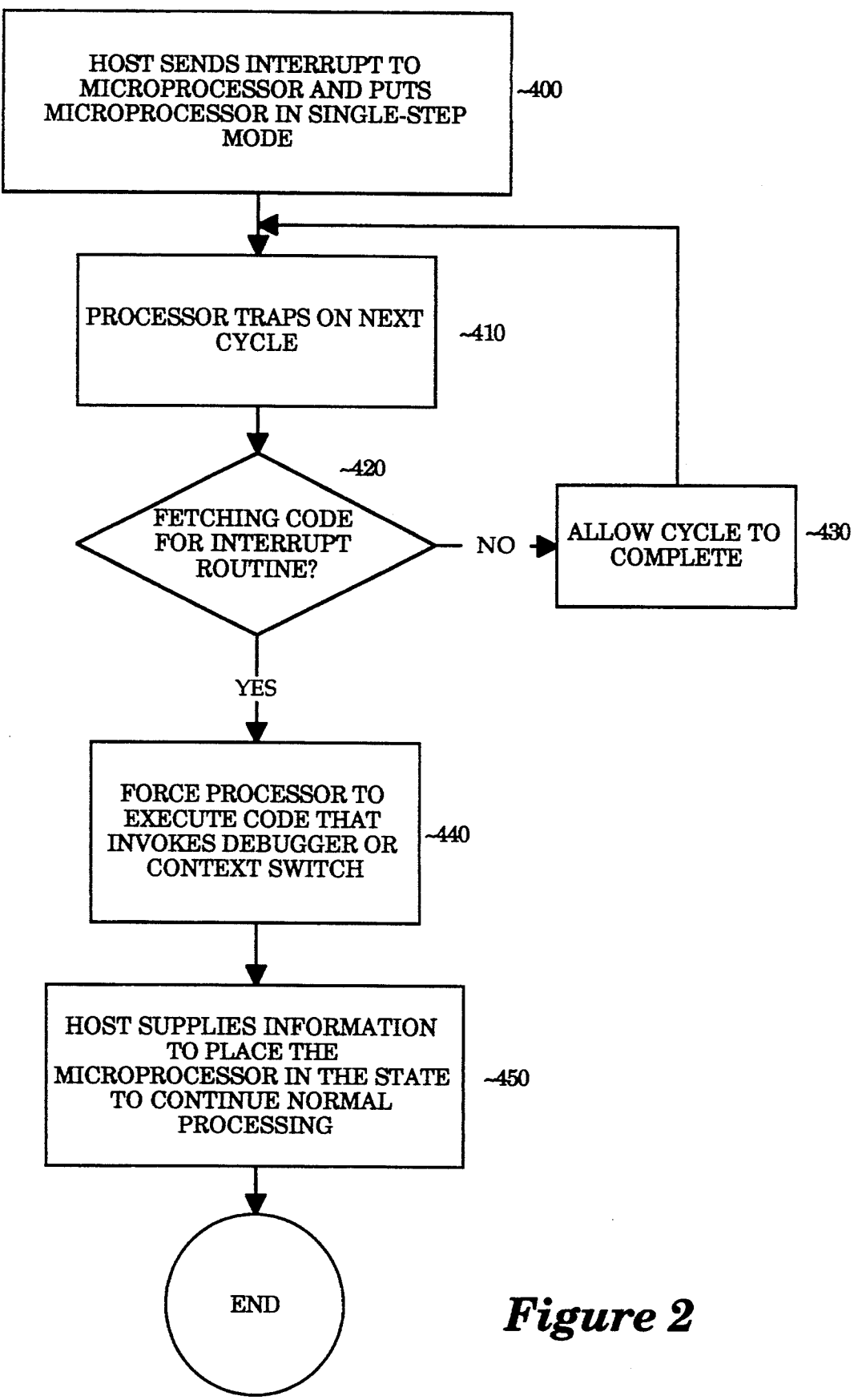
FIG. 2 is a flowchart illustrating the preferred embodiment of the process of the present invention.

In some instances, such as when it is necessary to perform debug operations and perform tasks outside the typical scope of the microprocessor, it is desirable that the host system be able to "takeover" the microprocessor to perform these tasks. Once the tasks are completed, the microprocessor is enabled to continue its normal processing. The process for performing the takeover is described with respect to FIG. 2. At step 400, the host sends an interrupt to the microprocessor and places the microprocessor in a single step mode. When an interrupt is issued, the microprocessor automatically, as part of normal interrupt processing, stores the processor state in the stack. For example, 80486 pushes the contents of the EFLAGS register onto the stack before pushing the address of the interrupted instruction. The single step mode causes the microprocessor to trap or stop execution after each instruction is executed. For example, the host processor places the 80486 microprocessor in single step mode by setting the trap all cycles bit in interface 240. Once the processor is in single step mode at block 410, the microprocessor will wait or trap on each bus cycle. By trapping on each bus cycle, the host is provided the opportunity to examine each bus request issued by the microprocessor. For further information regarding the trap all cycles bit and single step mode, see U.S. patent application Ser. No. 07/815,245, titled, "Memory Management Structure for I/O Emulation," filed Dec. 31, 1991.

The host processor, at step 420, determines if the microprocessor is fetching code for the interrupt service routine in response to the interrupt issued by the host system. If it is not yet fetching the code for the interrupt service routine, the host system permits the cycle to complete step 430 and again continues to monitor each instruction, steps 410, 420 and 430, until the host detects that the interrupt service routine is being sought by the microprocessor.

The host is able to monitor the microprocessor because the request for addresses and the like are issued by the microprocessor and sent out on the bus to the host system which is performing the emulation of the peripheral devices of the microprocessor. Similarly, the host system provides responses to various instructions and requests issued by the microprocessor. Furthermore, because the host computer system has knowledge of exactly how the microprocessor responds to interrupts and the steps performed by the microprocessor to service the interrupt, the host computer system can monitor the bus cycles initiated by the microprocessor and intercept those necessary to feed the microprocessor the code that is to be executed during the takeover. Therefore, at step 440, once the host has determined that the microprocessor is attempting to fetch the code for the interrupt service routine, the host can issue data which forces the microprocessor to execute the code to perform the function desired such as debug functions or code to perform a context switch of processes.

Once the microprocessor has performed the operations dictated by the host computer system, the host then supplies the information needed to place the microprocessor in the state to continue normal processing, step 450. The normal end of interrupt instruction, e.g. the IRET instruction in the 80486, is executed, whereby the microprocessor leaves the interrupt mode and normal processing is resumed. By utilizing this process, the microprocessor can be controlled to perform operations not typically within its scope and to perform operations without obstructing the microprocessor's typical operations.

Figure 3:
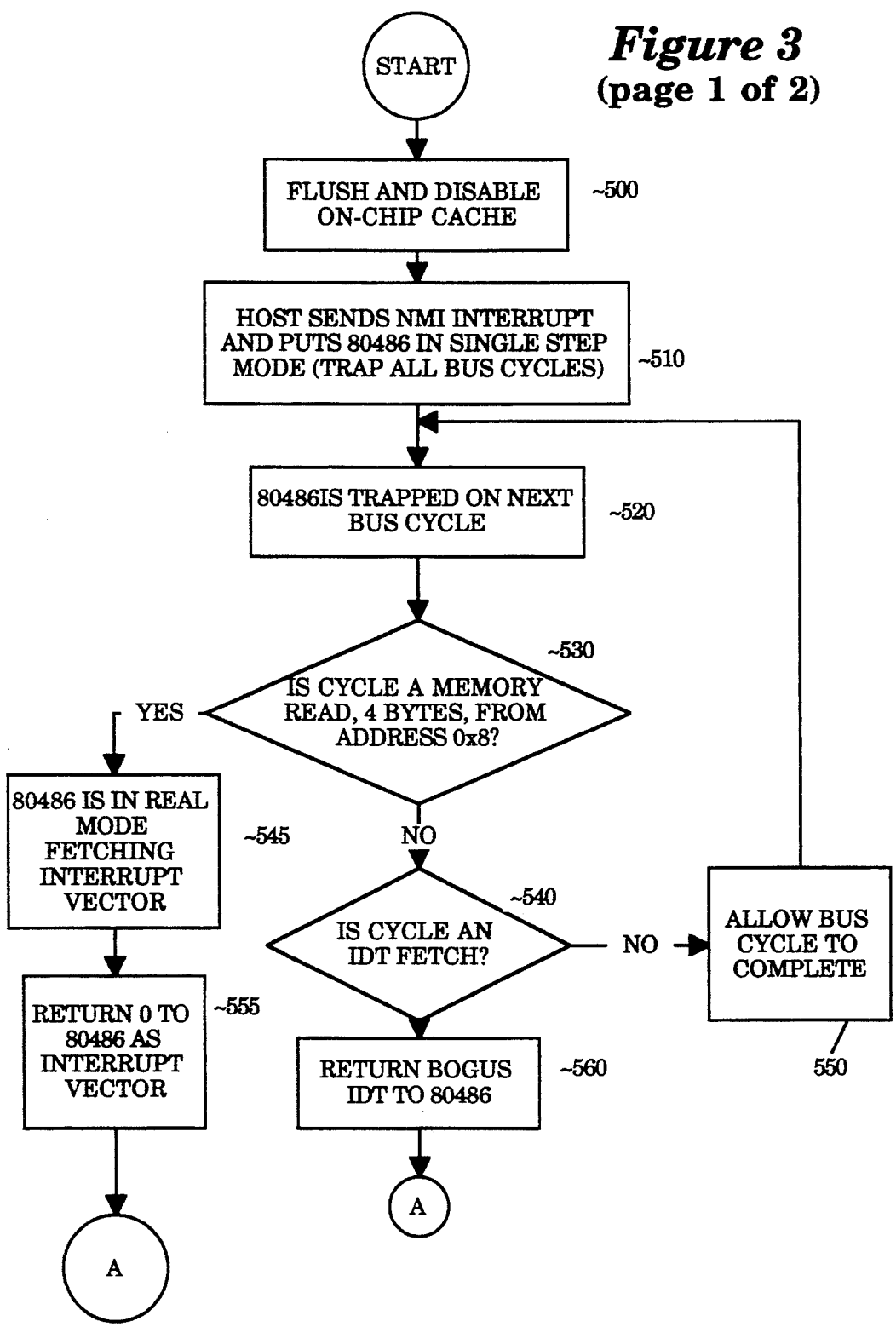
FIG. 3 is a flowchart illustrating a specific implementation of the preferred embodiment of the present invention.
Figure 3:
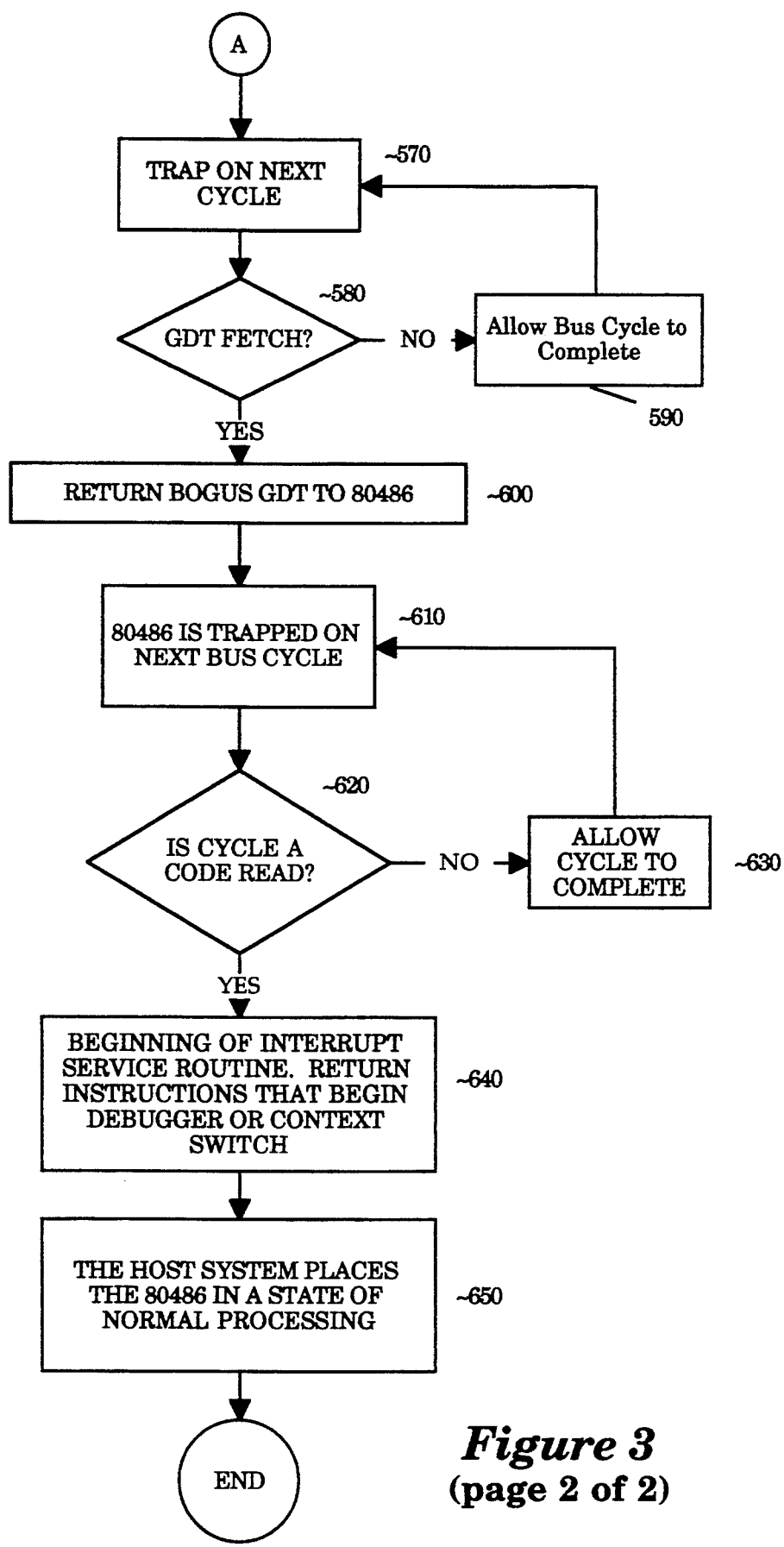

FIG. 3 describes the takeover process employed for a 80486 microprocessor. At step 500, the host issues an instruction to cause the microprocessor to flush and disable the on-chip or primary cache. This step is performed in order ensure that a primary cache hit is not found in order that each instruction is sent out on the bus and the host can monitor the steps taken by the microprocessor and intercept those requests as necessary in order to perform the takeover. At step 510, the host sends an non-maskable interrupt (NMI) to the microprocessor and places the 80486 in single step mode by setting the trap all cycles bit in interface 240 such that all bus cycles are trapped. Thus, after each cycle, the microprocessor halts until a signal is received to proceed to the next instruction. At step 520, the microprocessor traps on the next bus cycle, the host processor reads the instruction and determines if the instruction is a memory read of four bytes from address 0×8. The address 0×8 indicates that the 80486 is attempting to fetch an interrupt vector while in real mode. The address information is determined according to the specification of the 80486 microprocessor. Further information regarding addressing can be found in Intel Corporation, *i486 Microprocessor Programmer's Reference Manual*, (Intel Corporation, 1990) and *i486 Microprocessor Hardware Reference Manual* (Intel Corporation, 1990).

To service the interrupt issued by the host processor, the 80486 proceeds through predetermined steps to perform the service of the interrupt. When the 80486 attempts to fetch the interrupt vector, step 545, the host returns a value of zero to the 80486, step 555, in response for its request to read the memory location where the interrupt vector is located. At step 610, the 80486 is again trapped on the next cycle and the host computer system now examines the request to determine if the 80486 is attempting to perform a code read, step 620. If the microprocessor is not attempting to perform a code read, the host will permit the cycle to complete, step 630, and will again continue to monitor the cycles until a code read is issued by the microprocessor.

At this point, step 640, what typically would be the beginning of the interrupt service routine becomes the opportunity of the host computer system to direct the microprocessor to perform a particular operation, such as read a register and output it on the bus to provide information regarding the state of the microprocessor, enabling the host system to perform debug operations. Similarly, as will be described below, the host system can direct the microprocessor to perform a context switch, such that the microprocessor will continue processing in the context of another process. Once the microprocessor performs the desired operations during the takeover process, at step 650 the host system places the microprocessor in a state such that normal processing can continue.

Referring back to step 530 in FIG. 3, if the cycle is not a memory read for four bytes from address 0×8, then the 80486 is not operating in real mode, but rather is operating in the protected mode or the virtual 8086 mode. While in the protected mode, the 80486 services interrupts by performing a different sequence of steps. At step 540 the host examines the request issued by the 80486 to determine if the cycle is in an interrupt descriptor table (IDT) fetch. If it is not, the bus cycle is allowed to complete because the microprocessor has not yet reached the cycle at which it begins interrupt servicing.

At step 540, if the host determines that the cycle is an IDT fetch, the host returns a invalid IDT value to the microprocessor, step 560. The microprocessor does not recognize that an invalid value has been provided and continues cycling to service the interrupt. The host processor, step 580, monitors the cycles of the microprocessor to determine when a fetch is performed of the global descriptor table (GDT). The host permits cycles to complete, step 590, if a GDT fetch has not yet been performed. Once the host determines that a GDT fetch is being attempted, at step 600 the host returns invalid GDT value to the microprocessor. These steps supply the values utilized by the microprocessor to determine the address at which the interrupt service routine is located. Using the values found in the GDT and the IDT, an address is formed and the microprocessor performs a code read beginning at that address to begin execution of the interrupt service routine. As invalid or bogus values have been provided in response to the requests for the IDT and GDT values, at step 610, 620 the trap cycles are again monitored by the host processor to determine when code read is performed. At that point, step 640, the access to the interrupt service routine has been attempted and the host responds by providing the code that the microprocessor is to perform during the takeover. Once the process has been performed, at step 650, the host system places the microprocessor in a state for normal processing.

Figure 4:
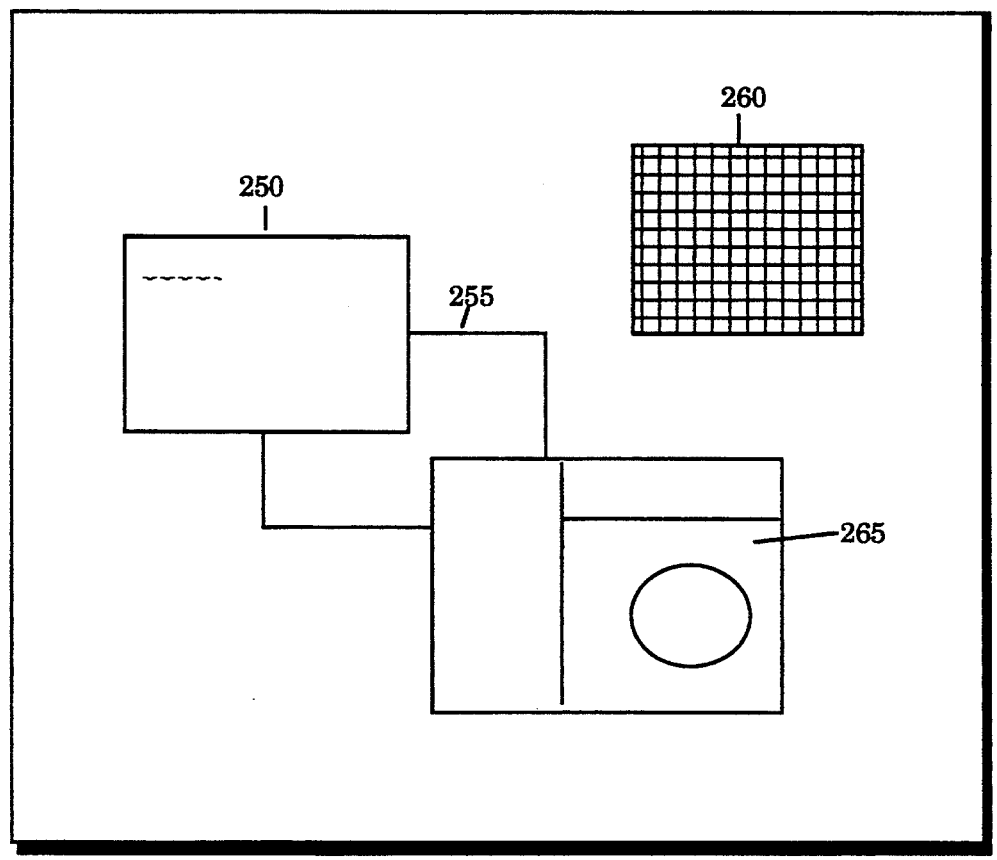
FIG. 4 is illustrative of the multiple windows which may be present in the preferred embodiment of the system of the present invention.

The host processor typically has a multi-tasking capability which permits multiple processes to be executing in a concurrent fashion. This is typically evident in today's window systems which provide, referring to FIG. 4, a multiplicity of windows 250, 255, 260, 265, in which a different process is executing within each window. For example, a word processing program may be executing in window 250, an accounting program could be executing in window 260, and the microprocessor 200 is also multi-tasking and can execute multiple processes concurrently; however, a microprocessor is limited in the type of processes it can run concurrently. In particular, an i486 microprocessor has three modes in which it can execute: the virtual 8086 (V86) mode, the real mode and the protected mode. The real mode emulates the programming environment of the 8086 processor, with a few extensions (such as the ability to exit this mode and enter another mode). Reset initialization places the processor into real mode. The V86 mode is another form of 8086 emulation mode but is compatible with system protection and memory management.

The protected mode uses the native 32-bit instruction set of the processor. In this mode, all instructions and architectural features are available including various levels of protection (hence the name "protected mode"). The protected mode operates to take control over the processor 200 and protects certain memory and registers from access by other processes. This is often desirable for full exploitation of the capabilities of the processor. However, only one protected mode process may execute at one time because only one process can take control of the processor 200. This was not an apparent problem when the microprocessor 200 operated in an independent environment. However, if the processor is connected to a workstation host processor 100 running a the window system, it is quite easy for a user to set up additional windows 255, 265 and attempt to execute processes which are protected mode processes. When this occurs the microprocessor 200 incurs errors and will not execute properly.

To enable a user to execute multiple protected mode processes, a method for performing context switching in which each protected mode process is allotted a pre-determined amount of time to access and control the microprocessor 200 to execute instructions is utilized. This is achieved using the innovative takeover process initiated by the host. At the end of the allotted time, the host processor 100 interrupts the microprocessor 200 and causes the state of the current process (hereinafter referred to as Process 1) executing on microprocessor 200, to be saved and the state of the next process to be executed by the microprocessor 200 (hereinafter referred to as Process 2) to be restored in the registers of the microprocessor, such that the microprocessor 200 will continue to execute in the context of the second process. The present invention permits the host processor to seize control of the microprocessor to perform a context switch in the microprocessor without modifying the interrupt tables and therefore without the need to know the status of the process or the locations of the Interrupt Descriptor Table (IDT) and Global Descriptor table (GDT) accessed by the microprocessor during the servicing of an interrupt. This is quite important because in a mode that controls the entire state of a processor (such as the protected mode), there is no way for the host processor to know the location of the interrupt tables in order to control the interrupt service routine and perform a context switch.

The host causes an interrupt to be generated on the microprocessor and controls the interface to trap each instruction cycle. This allows the host processor to intercept each request supplied by the microprocessor and provide the proper data to change the program counter of the microprocessor to access the desired context switch routine. Thus, when the host causes an interrupt to perform a context switch, the microprocessor responds to service the interrupt, retrieving various pieces of information (such as table address, service routine addresses, etc.) in order to execute the interrupt service routine for that interrupt. The host processor monitors the microprocessor activity, in particular, the information requested ("the fetches"), and timely feeds the microprocessor information such that when the interrupt service routine is to be executed, the microprocessor executes code at a known location which performs a context switch from the current process to the next process to be executed.

The code which performs the actual context switch saves the state of the current process by saving the data currently located in various registers and changes the address space from that utilized by the current process to that utilized by the next process to be executed by either changing the MMU tables of the host or by changing the map and mask registers in the interface. The registers are then loaded with the data indicative of the state of execution of the next process and process execution continues in the context of the next process.

The innovative takeover process may be used to perform non-invasive debugging of the microprocessor and the host emulation process. When debugging, it may be necessary to examine the contents of various registers of the microprocessor. However, this should be done without disturbing the contents of registers of the microprocessor or disturbing the state of execution of the microprocessor. Furthermore, the optimum manner to read the contents of the registers is without utilizing specialized code on the microprocessor itself to access the registers. This has the effect of disrupting the state with the microprocessor. The takeover process may be used to direct the microprocessor to execute register read instructions followed by an I/O instruction to output the data read from the register to the bus. The host processor can then extract the data off the bus and utilize the information for debugging purposes. For example, on the 80486 to non-invasively read the EAX register the "OUT 0, EAX" instruction is executed to read the EAX register and output it to the host. The contents of the EAX register is left undisturbed and once the host has finished reading the contents of other registers for debug purposes, a return from interrupt instruction is sent to the microprocessor and the single step mode is removed returning the microprocessor to its state prior to the takeover process. Exemplary code for performing the debugging process is provided in Appendix A. This code is executed on a SPARCstation® workstation manufactured by Sun Microsystems, Inc., Mountain View, Ca. The microprocessor utilized is an 80486 microprocessor manufactured by Intel Corporation, Santa Clara, California.

The invention has been described in conjunction with the preferred embodiment. Numerous alternatives, modifications, variations and uses will be apparent to those skilled in the art in light of the foregoing description.

I claim:

1. In a computer system comprising a host processor, a microprocessor and memory coupled via a bus, a method for the host processor performing a takeover of the normal processing of the microprocessor comprising the steps of:

issuing an interrupt to the microprocessor, said interrupt causing the microprocessor to perform process steps to service the interrupt;

monitoring the bus cycles initiated by the microprocessor;

when the microprocessor initiates bus cycles which request information regarding the address of the interrupt service routine, intercepting the bus cycles and providing the address of a routine to be performed during the takeover of the microprocessor;

said microprocessor performing the routine starting at the address provided to the microprocessor by the host processor;

once the routine has been performed, returning the microprocessor from the interrupt state; and said microprocessor continuing normal processing.

2. The method for performing a takeover as set forth in claim 1, further comprising the step of placing the microprocessor into single step mode such that the microprocessor traps on all bus cycles enabling the host processor to monitor each bus cycle.

3. The method for performing a takeover as set forth in claim 1, wherein said host processor provides input/output device emulation for the microprocessor, said microprocessor issuing bus requests to access memory and the input/output devices by the host processor.

4. The method for performing a takeover as set forth in claim 1, further comprising the step of issuing a signal to the microprocessor to permit the bus cycle to complete if the bus cycle is not requesting information regarding the address of the interrupt service routine.

5. The method for performing a takeover as set forth in claim 4, wherein the step of issuing a signal to the microprocessor to permit the bus cycle to complete comprises providing information to the microprocessor in response to the bus cycle initiated.

6. The method for performing a takeover as set forth in claim 1, wherein the routine to be performed are commands to perform debug operations, wherein noninvasive debug operations are performed.

7. The method for performing a takeover as set forth in claim 6, wherein said debug operations provide at least a portion of the state of the microprocessor to the host processor.

8. The method for performing a takeover as set forth in claim 6, wherein said debug operations comprise reading registers of the microprocessor and providing the contents of the registers read to the host processor.

9. The method for performing a takeover as set forth in claim 1, wherein the routine to be performed is a program to perform a context switch of the microprocessor such that normal processing is continued in the context of the process switched into the microprocessor.

10. The method for performing a takeover as set forth in claim 9, wherein the context switch program saves the current state of the microprocessor in the memory and restores the state of the process to be executed in the microprocessor.

11. In a computer system comprising a host processor, a microprocessor and memory coupled via a bus, said host processor providing input/output device emulation for the microprocessor, said microprocessor issuing bus requests to access memory and devices emulated by the host processor, a process for the host processor performing a takeover of the normal processing of the microprocessor comprising the steps of:

issuing an interrupt to the microprocessor, said interrupt causing the microprocessor to perform process steps to service the interrupt; and monitoring the bus cycles initiated by the microprocessor;

if the microprocessor is in a first mode and initiates a bus cycle which requests a memory read to fetch an interrupt vector indicating the address in memory of the interrupt service routine, intercepting the bus cycle and returning to the microprocessor a bogus value;

if the microprocessor is in a second mode, when said microprocessor initiates a bus cycle which requests a memory read to fetch a value from an interrupt descriptor table which provides information regarding the location of the interrupt service routine, intercepting the bus cycle and returning to the microprocessor a bogus value, and when the microprocessor initiates a bus cycle which requests a memory read to fetch a value from a general descriptor table regarding the location of the interrupt service routine, intercepting the bus cycle and returning the microprocessor a bogus value;

when the microprocessor initiates a bus cycle which requests a code read, providing the code of the routine to be performed during the takeover;

said microprocessor performing the routine as determined by the code provided to the microprocessor by the host processor;

once the routine has been performed, returning the microprocessor from the interrupt state;

said microprocessor continuing normal processing.

12. The method for performing a takeover as set forth in claim 11, further comprising the step of placing the microprocessor into single step mode such that the microprocessor traps on all bus cycles enabling the host processor to monitor each bus cycle.

13. The method for performing a takeover as set forth in claim 11, further comprising the step of issuing a signal to the microprocessor to permit the bus cycle to complete if the bus cycle is not requesting information regarding the address of the interrupt service routine.

14. The method for performing a takeover as set forth in claim 11, wherein the routine to be performed are commands to perform debug operations, wherein noninvasive debug operations are performed.

15. The method for performing a takeover as set forth in claim 14 wherein said debug operations provide at least a portion of the state of the microprocessor to the host processor.

16. The method for performing a takeover as set forth in claim 11, wherein the routine to be performed is a program to perform a context switch of the microprocessor such that normal processing is continued in the context of the process switched into the microprocessor.

17. The method for performing a takeover as set forth in claim 16, wherein the context switch program saves the current state of the microprocessor in the memory and restores the state of the process to be executed in the microprocessor.

18. In a computer system comprising a host processor, a microprocessor and memory coupled via a bus, said host processor providing the input/output device emulation for the microprocessor, said microprocessor issuing bus requests to access memory and devices emulated by the host processor, an apparatus for the host processor performing a takeover of the normal processing of the microprocessor comprising:
   interrupt means for issuing an interrupt to the microprocessor, said interrupt causing the microprocessor to perform process steps to service the interrupt;
   monitoring means for monitoring the bus cycles initiated by the microprocessor;
   bus cycle intercept means to intercept bus cycles when the microprocessor initiates bus cycles which request information regarding the address of the interrupt service routine, and provide the address of a routine to be performed during the takeover of the microprocessor such that said microprocessor performs the routine starting at the address provided to the microprocessor by the intercept means;
   means for returning the microprocessor from the interrupt state; and
   said microprocessor continuing normal processing.

19. The apparatus as set forth in claim 18, further comprising a bus interface coupled between the microprocessor and the bus, said bus interface interfacing the microprocessor to the bus to provide the emulation of memory and devices coupled to the microprocessor.

20. The apparatus as set forth in claim 18, wherein said apparatus comprises a single step mode, said host processor issuing a signal to place the apparatus in single step mode such that the microprocessor traps after each bus cycle, said single step mode providing time for the monitor means to monitor the bus cycles initiated by the microprocessor.

21. In a computer system comprising a host processor, a microprocessor and memory coupled via a bus, said host processor providing the input/output device emulation for the microprocessor, said microprocessor issuing bus requests to access memory and devices emulated by the host processor, a process for the host processor performing a takeover of the normal processing of the microprocessor comprising:
   interrupt means for issuing an interrupt to the microprocessor, said interrupt causing the microprocessor to perform process steps to service the interrupt;
   means for monitoring the bus cycles initiated by the microprocessor;
   means for intercepting bus cycles of the microprocessor such that,
      if the microprocessor is in a first mode and initiates a bus cycle which requests a memory read to fetch an interrupt vector indicating the address in memory of the interrupt service routine, said means intercepting the bus cycle and returning to the microprocessor a bogus value,
      if the microprocessor is in a second mode, when said microprocessor initiates a bus cycle which requests a memory read to fetch a value from an interrupt descriptor table which provides information regarding the location of the interrupt service routine, said means intercepting the bus cycle and returning to the microprocessor a bogus value, and when the microprocessor initiates a bus cycle which requests a memory read to fetch a value from a general descriptor table regarding the location of the interrupt service routine, intercepting the bus cycle and returning the microprocessor a bogus value, and
      when the microprocessor initiates a bus cycle which requests a code read, said means intercepting the cycle and providing the code of the routine to be performed during the takeover, such that the microprocessor performs the routine as determined by the code provided to the microprocessor by the host processor;
   means for returning the microprocessor from the interrupt state once the routine has been performed; and
   said microprocessor continuing normal processing.

* * * * *